United States Patent [19]

Sasao

[11] Patent Number: 4,924,416
[45] Date of Patent: May 8, 1990

[54] APPARATUS FOR DETECTING RELATIVE CROWDING IN A HALL

[75] Inventor: Isao Sasao, Inazawa, Japan

[73] Assignee: Mitsubishi Denki Kabushiki Kaisha, Japan

[21] Appl. No.: 244,028

[22] Filed: Sep. 9, 1988

[30] Foreign Application Priority Data

Oct. 2, 1987 [JP] Japan ................. 62-249228

[51] Int. Cl.⁵ .......... H05B 37/02; H04N 7/18
[52] U.S. Cl. ................. 364/550; 358/108; 340/825.06; 362/276; 315/151; 187/130; 187/131
[58] Field of Search ......... 382/58; 358/107, 108; 356/378–380; 364/550, 524.01, 176; 340/825.06, 825.1, 825.11, 825.13; 315/149–151, 155–158; 362/276; 187/130, 131–133

[56] References Cited

U.S. PATENT DOCUMENTS

| 4,135,116 | 1/1979 | Smith | 315/151 |
| 4,467,246 | 8/1984 | Tanaka et al. | 315/151 |
| 4,516,055 | 5/1985 | Nelson | 315/151 |
| 4,555,724 | 11/1985 | Enriquez | 358/107 |
| 4,595,860 | 6/1986 | Taylor | 315/151 |
| 4,646,140 | 2/1987 | Bailey et al. | 358/108 |
| 4,701,669 | 10/1987 | Head et al. | 315/155 |
| 4,703,344 | 10/1987 | Hisano et al. | 358/107 |

FOREIGN PATENT DOCUMENTS 57-30782  6/1982  Japan .

Primary Examiner—Parshotam S. Lall
Assistant Examiner—Brian M. Mattson
Attorney, Agent, or Firm—Leydig, Voit & Mayer

[57] ABSTRACT

An apparatus detects the degree of crowding in an elevator hall utilizing a television camera to provide video signals which are stored as video data and including an illumination controller which controls the brightness of an illuminator for the elevator hall when the difference between reference data and video data has exceeded a predetermined value and has continued for a predetermined time, so that the difference between the reference data and the video data may fall within the predetermined value.

6 Claims, 3 Drawing Sheets

APPARATUS FOR DETECTING RELATIVE CROWDING IN A HALL

BACKGROUND OF THE INVENTION

This invention relates to an apparatus in which the degree of crowding in an elevator hall is detected by processing data imaged with a television camera.

Heretofore, there has been an apparatus which is adapted to detect the degree of crowding of an elevator hall with waiting persons by the use of a television camera. Such an apparatus for detecting the degree of crowding in the elevator hall having waiting persons is, for example, disclosed in the official gazette of Japanese Patent Application Publication No. 30782/1982, and this prior-art apparatus is shown in FIG. 3.

Referring to FIG. 3, an elevator hall is scanned by a television camera 1, the resulting signal is digitized by an analog-to-digital converter (hereinbelow, termed "A/D converter") 2, and the digital signal is processed in an arithmetic unit 14, thereby to extract a feature in pixel unit.

When no persons are waiting in the elevator hall, the result of the above process is stored in a memory 16. Subsequently, signals in the presence of a waiting person or persons in the elevator hall are stored in a memory 15. The stored contents of the memories 15 and 16 are compared for each pixel by means of a comparator 17, and the output is produced in a case where the corresponding signals of the pixel are different. The number of the non-coincident outputs delivered from the comparator 17 is counted by a counter 18. Accordingly, the content of the counter 18 corresponds to the degree of crowding on each occasion.

The detection accuracy in this case depends greatly upon the brightness of the elevator hall. More specifically, the difference between the presence and absence of at least one waiting person depends upon the difference between the quantities of light entering the television camera, namely, the brightnesses of the elevator hall and can be precisely detected if the difference is great. However, when the difference is small, the detection accuracy decreases. Even with the same illumination equipment, the brightness of the elevator hall changes continuously under the influence of outdoor daylight. In the nighttime, etc., accordingly, the whole elevator hall darkens due to the dark surroundings, and the detection accuracy decreases. Moreover, in a case where the reference data has been set under a bright condition, there is the drawback that, when the whole image darkens, the presence of a waiting person is misrecognized.

SUMMARY OF THE INVENTION

The present invention has the objective to solve the aforementioned problems and has for its main object to provide an apparatus for detecting the degree of crowding in an elevator hall by which a stable detection accuracy is always attained even when the brightness of the elevator hall changes due to changes in outdoor light.

The apparatus for detecting the degree of crowding in an elevator hall according to this invention comprises an illumination controller which controls the brightness of an illuminator for the elevator hall when the difference between reference video data and hall video data has exceeded a predetermined value, and this state is continued for a predetermined time.

With the apparatus for detecting the degree of crowding in the elevator hall as thus constructed, even when the brightness of the elevator hall changes under the influence of outdoor light, it can be immediately corrected so that a stable detection accuracy is always attained. Thus the degradation of elevator service attributed to erroneous detection can be prevented.

BRIEF DESCRIPTION OF THE DRAWINGS

Throughout the drawings, the same symbols indicate identical or equivalent portions.

DESCRIPTION OF THE PREFERRED EMBODIMENT

Figure 1:
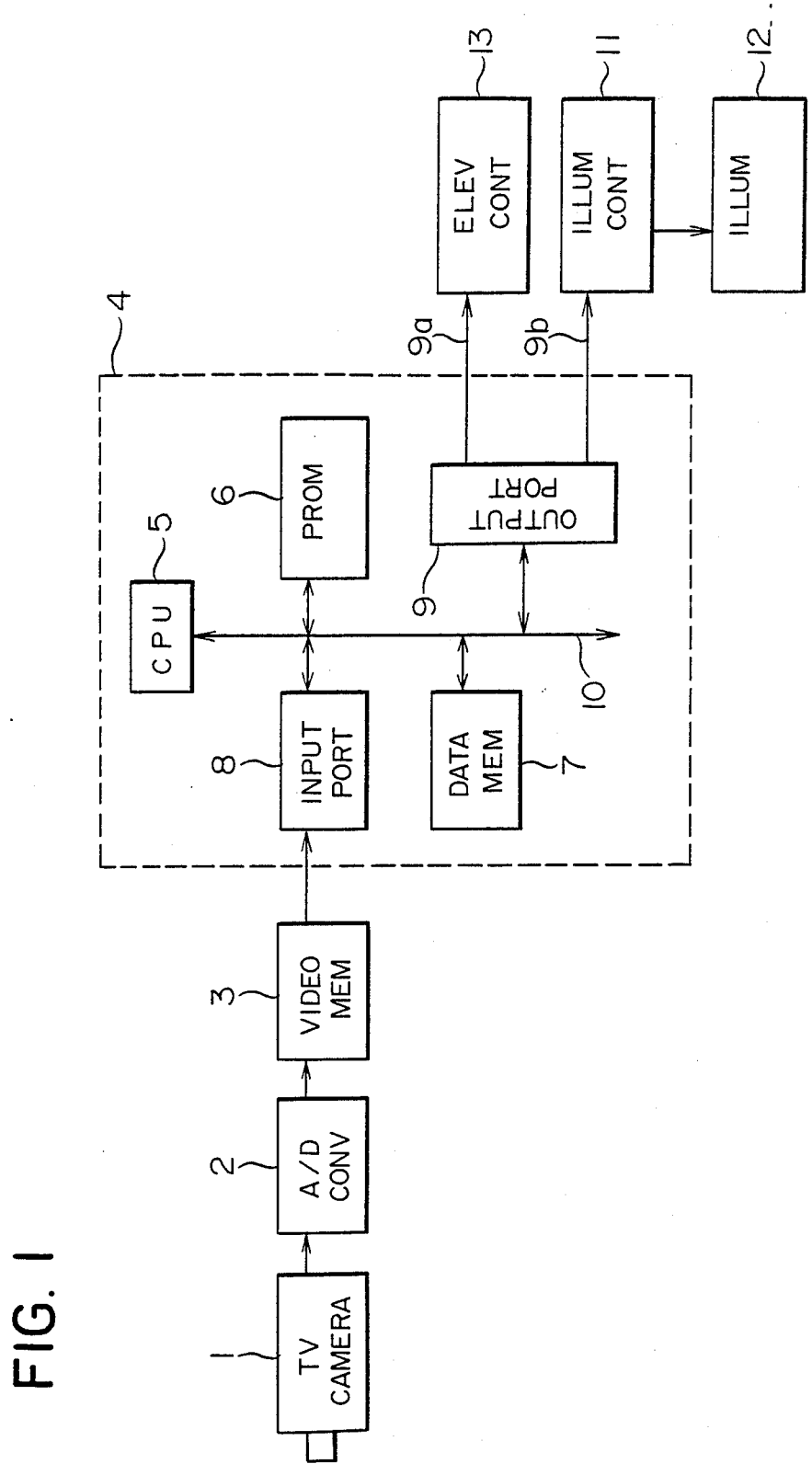
FIG. 1 is a block diagram illustrative of an apparatus for detecting the degree of crowding in an elevator hall according to an embodiment of this invention.
Figure 2:
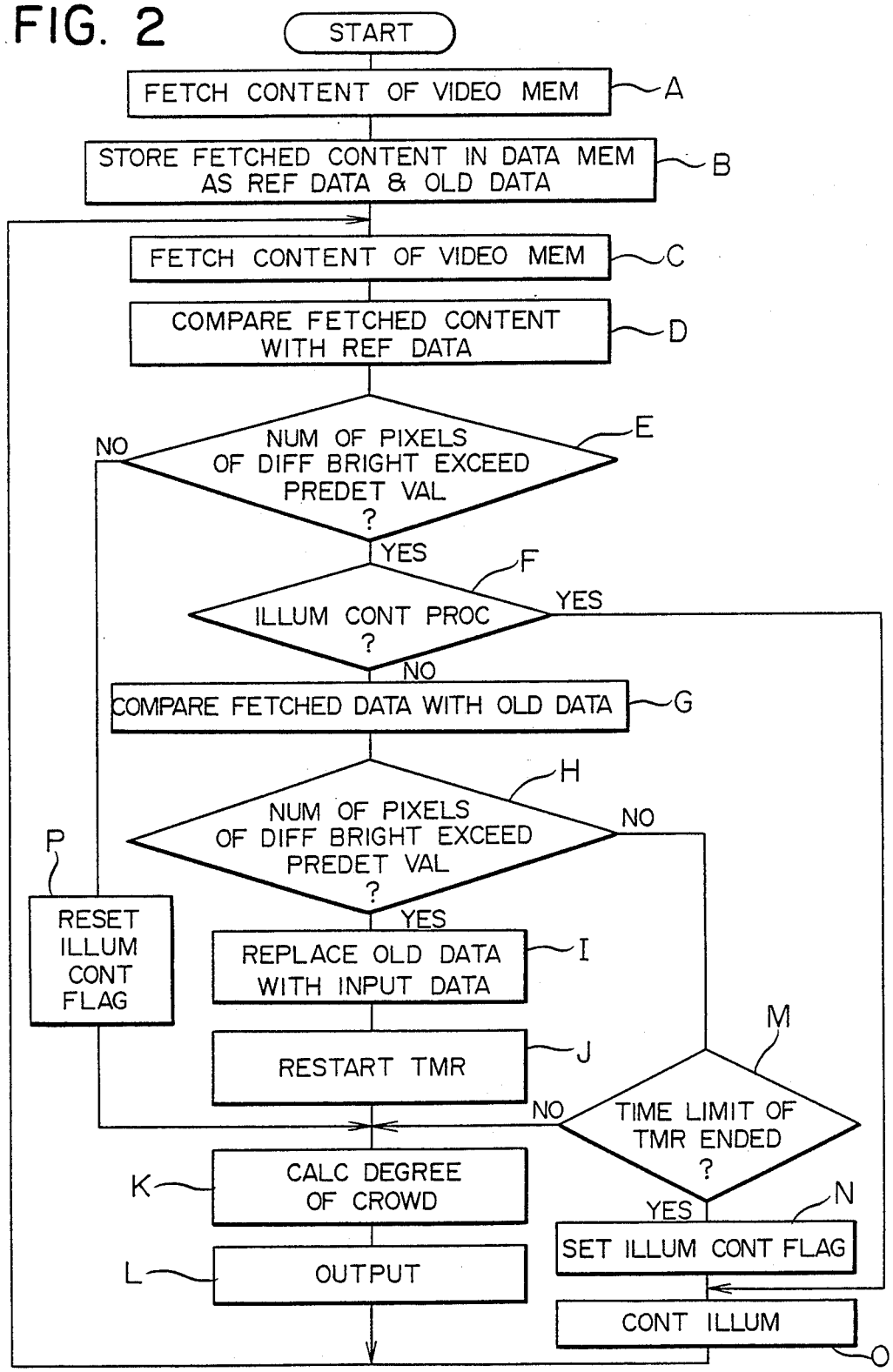
FIG. 2 is a flow chart for explaining the operation of the apparatus in FIG. 1.
Figure 3:
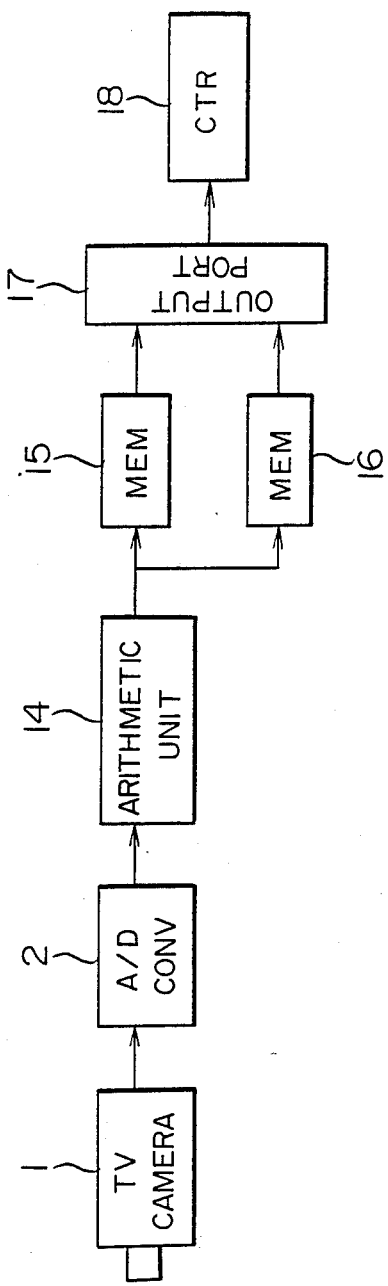
FIG. 3 is a block diagram illustrative of a prior-art apparatus for detecting the degree of crowding in an elevator hall.

Now, an embodiment of this invention will be described with reference to the drawings. In FIG. 1, numeral 3 designates a video memory, which stores hall video data obtained by digitizing a video signal produced by a television camera 1 and fed to an A/D converter 2. The hall video data is stored sequentially in synchronism with a video synchronizing signal, not shown, and the latest hall video data is stored at all times. Numeral 4 designates a degree-of-crowding processing circuit which processes the information of the video memory 3 to calculate the degree of crowding, and generates degree-of-crowding data 9a and illumination control data 9b on the basis of the calculated result. The processing circuit 4 is configured of a CPU 5, a program memory 6 in which a program shown in FIG. 2 is stored, a data memory 7 which stores therein data necessary for degree-of-crowding processing, an input port 8 and an output port 9. Shown at numeral 11 is an illumination controller, which controls an illuminator 12 on the basis of the illumination control data 9b delivered from the output port 9. Shown at numeral 13 is an elevator controller, which receives the degree-of-crowding data 9a from the output port 9 as an input and controls an elevator in correspondence to this data. A buas line 10 serves to transfer signals among the CPU 5, program memory 6, data memory 7, input port 8 and output port 9.

Next, the operation of the apparatus for detecting the degree of crowding of the elevator hall constructed as explained above will be described. Under a standard illumination condition, the state of the elevator hall in the absence of a person is scanned by the television camera 1, the video signal produced by the camera is digitized by the A/D converter 2, and the digital video signals are successively stored as reference video data in the video memory 3. Here, the reference video data stored in the video memory 3 are successively transmitted to the data memory 7 through the input port 8 as reference data under the control of the CPU 5. Subsequently, video signals are produced by the camera 1 and stored anew as hall video data. This hall video data is compared with the reference data already stored in the data memory 7, i.e., the number of pixels whose brightnesses exceed a predetermined value is counted, and the degree of crowding is calculated from the count data. The calculated result is delivered through the output port 9 and supplied to the elevator controller 13 as the degree-of-crowding data 9a.

Meanwhile, in a case where the fluctuation of the brightness of the video data is within a predetermined magnitude and time, it is determined that the brightness of the elevator hall has changed, and the illumination control output 9b corresponding to the difference between the hall video data and the referenced data is delivered to the illumination controller 11 through the output port 9. Thus, the brightness of the illuminator 12 is controlled and changed to adjust the illumination level or brightness of the hall so that the difference between the brightness of the reference data and the hall video data falls within a predetermined value.

FIG. 2 is a flowchart showing the above operation, the respective steps of which will now be described. First, at step A, the content of the video memory 3 is fetched by the CPU 5 through the input port 8 in the processing circuit 4. Subsequently, at step B, the data items fetched by the CPU 5 are successively written and stored in the reference data area and old data area of the data memory 7. At step C, new video data is fetched from the video memory 3 by the CPU 5. At step D, the reference data and the video data fetched anew are compared for every pixel. Then, step E counts up each time the brightnesses of the reference data and the video data are determined to differ in the comparison of step D; in other words, it counts the number of pixels of different brightnesses and decides whether this first count value exceeds a preset value. Here, the control flow shifts to step F when the first count value exceeds the preset value, and it shifts to a step P when not. Step F decides whether the illumination control is proceeding, whereupon it is followed by a step O when the illumination control is proceeding, and by step G when not. At step G, old data is (data stored at step B in the case of initilization, and data stored at step I, at a later stage) and data fetched are compared. Subsequently, at step H, the number of pixels of different brightnesses are counted to provide a second count value of pixels, and whether this second count value exceeds a preset value is decided. Here, if the second count value at step H exceeds the preset value, the control flow shifts to step I, and if not to step M. At step I, the video data fetched anew is stored in the old data area. Subsequently, at step J, a timer for detecting the continuation time interval of the state in which the fluctuation of the brightness of the video data is within a predetermined magnitude is restarted from zero, whereupon the control flow shifts to step K. At step K, the degree of crowding is calculated from the first count value counted at step E. Subsequently, at step L, the result of the calculation at step K is sent through the output port 9 to the elevator controller 13 as the degree-of-crowding data 9a.

On the other hand, step M decides whether the time limit of the timer started at step J has ended. If the time limit has ended, it means that the fluctuation of the brightness of the video data is within the predetermined magnitude and has continued for the predetermined time. The control flow shifts to step N upon judging that the brightness of the elevator hall has fluctuated within the predetermined magnitude. In contrast, if the time limit has not ended, the control flow shifts to step K. Step N sets an illumination control flag to indicate the proceeding of the illumination control and is followed by step O. This step O determines whether the illuminator 12 is to be brightened or darkened and the extent of the change of the brightness thereof. This determination is made according to the number of brighter or darker pixels counted at step E as the first count value, and the calculated value is delivered through the output port 9 to the illumination controller 11 as the illumination control signal 9b. The illumination controller 11 controls the illuminator 12 in accordance with the signal 9b. Thereafter, the control flow returns to step C.

Referring back to step E, when the decision is NO, it means that the difference between the brightnesses of the reference data and the video data fetched anew is within the predetermined value, namely, that the brightness of the elevator hall has become a predetermined brightness. Therefore, the control flow shifts to step P at which the illumination control flag is reset to end the illumination control. This is then followed by step K.

In the apparatus thus constructed, the fluctuation of the brightness of the elevator hall can be automatically corrected, and a stable illumination state is attained at all times, whereby an erroneous detection ascribable to the degradation of the detection accuracy can be prevented. The degradation of elevator service due to such an erroneous detection can be prevented.

The illumination controller can be realized by any of the known techniques, such as controlling the supply voltage which is applied to the illuminator, employing an A.C. power source and controlling the phase thereof, and by employing a pulse drive system and controlling the duty cycle of pulses.

As described above, according to this invention, a change in the brightness of an elevator hall is detected, and an illuminator is controlled so that the brightness of the elevator hall may fall withinn a predetermined value. Therefore, the brightness of the elevator hall becomes uniform without the influence of outdoor daylight, and an apparatus for detecting the degree of crowding in the elevator hall which exhibits a stable and high detection accuracy is provided.

What is claimed is:

1. An apparatus for determining relative crowding by people of a hall comprising:
   a variable intensity illuminator for varying illumination intensity in a hall;
   a television camera for generating images of the hall, the images having a brightness depending upon the illumination intensity in and crowding of the hall and being composed of pixels;
   means for storing the images generated by said camera as:
   (a) current video data;
   (b) reference video data obtained with a predetermined illumination intensity and a predetermined degree of crowding in the hall; and
   (c) old video data, periodically replaced with current video data; and
   a computer receiving the current, reference, and old video data from said means for storing for: (i) comparing the brightness of the current video data to the brightness of the reference video data; (ii) comparing the brightness of the current video data to the brightness of the old video data; and (iii) replacing the old video data in said means for storing with current video data in response to the comparison of the brightness of the current video data to the brightness of brightness produced with a reference illumination intensity; and a computer operatively connected to said illuminator controller for calculating relative crowding in the hall from the illumination intensity producing the image of the hall of predetermined brightness relative to the reference illumination intensity.

2. The apparatus according to claim 1 including a timer controlling said computer for a predetermined time interval during which the comparison of the current video data to the old video data is made.

3. The apparatus according to claim 1 wherein said computer counts the pixels in each image exceeding a reference brightness to produce a count value for each image as the video data of each image used for comparing the current video data, the reference video data, and the old video data.

4. The apparatus according to claim 3 wherein the illumination intensity of said variable intensity illumination is adjusted when the difference between the count values of the current video data and of reference video data exceeds a predetermined value.

5. An apparatus for detecting relative crowding by people of a hall comprising:
a variable intensity illuminator for varying illumination intensity in a hall;
a television camera for generating an image of the hall, the image having a brightness depending upon the illumination intensity in and crowding of the hall and being composed of pixels;
an illuminator controller receiving and responsive to the image for controlling the variable intensity illuminator, thereby varying the illumination intensity in the hall to produce an image of the hall of a predetermined brightness relative to a reference the old video data; for adjusting said variable intensity illuminator, thereby varying the illumination intensity in the hall when the comparison of the brightness of the current video data to the brightness of the old video data indicates a difference exceeding a predetermined value; and measuring the adjustments of said variable intensity illuminator from which relative crowding in the hall is determined.

6. The apparatus according to claim 5 wherein said illuminator controller adjusts the variable intensity illuminator to vary the illumination intensity in the hall when the brightness of an image of the hall is different from the predetermined brightness during a predetermined time interval.

* * * * *

UNITED STATES PATENT AND TRADEMARK OFFICE
CERTIFICATE OF CORRECTION

PATENT NO.  : 4,924,416

DATED       : May 8, 1990

INVENTOR(S) : Isao Sasao

It is certified that error appears in the above-identified patent and that said Letters Patent is hereby corrected as shown below:

Column 4, line 67 - Column 5, line 5, delete the text in its entirety and replace it with --the brightness of the old video data; for adjusting said variable intensity illuminator, thereby varying the illumination intensity in the hall when the comparsion of the brightness of the current video data to the brightness of the old video data indicates a difference exceeding a predetermined value; and measuring the adjustments of said variable intensity illuminator from which relative crowding in the hall is determined.--.

Column 6, lines 10-18, delete the text in its entirety and replace it with --brightness produced with a reference illumination intensity; and a computer operatively connected to said illuminator controller for calculating relative crowding in the hall from the illumination intensity producing the image of the hall of predetermined brightness relative to the reference illumination intensity.--.

Claim 4, column 5, lines 17 and 18, change "illumination" to --illuminator--.

Signed and Sealed this

Fourteenth Day of January, 1992

*Attest:*

HARRY F. MANBECK, JR.

*Attesting Officer*      *Commissioner of Patents and Trademarks*